Figure 1:
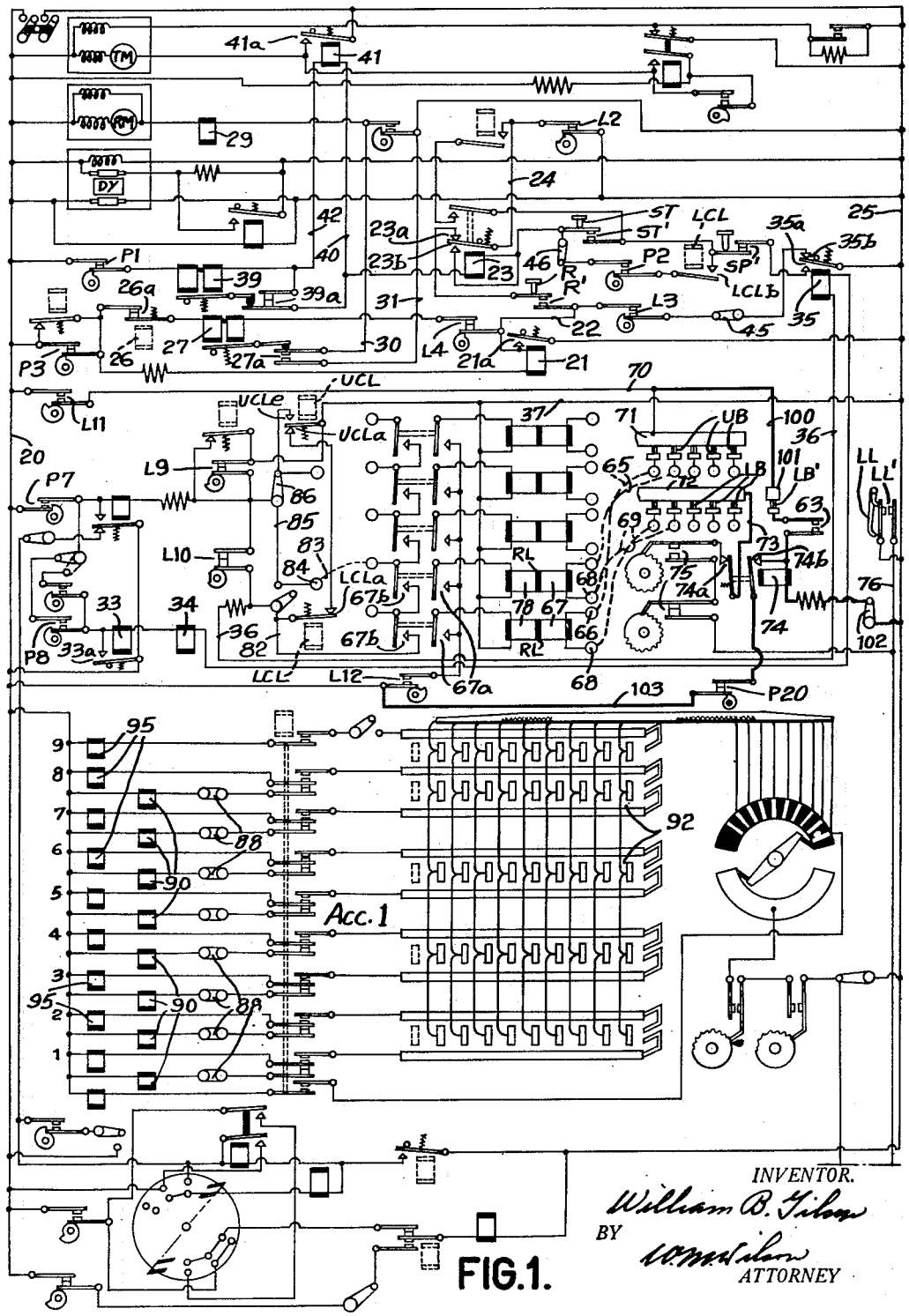

June 4, 1940.  W. B. GILSON  2,203,015
ACCOUNTING MACHINE
Filed March 11, 1936  3 Sheets-Sheet 2

INVENTOR
William B. Gilson
BY
W. M. Wilson
ATTORNEY

June 4, 1940.  W. B. GILSON  2,203,015
ACCOUNTING MACHINE
Filed March 11, 1936  3 Sheets-Sheet 3
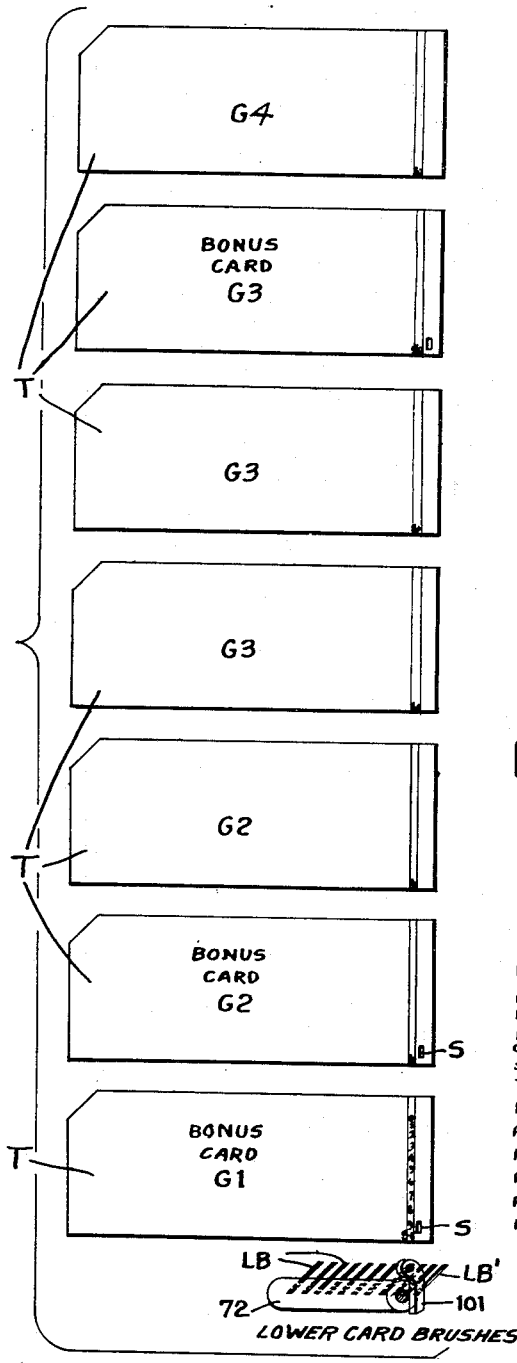
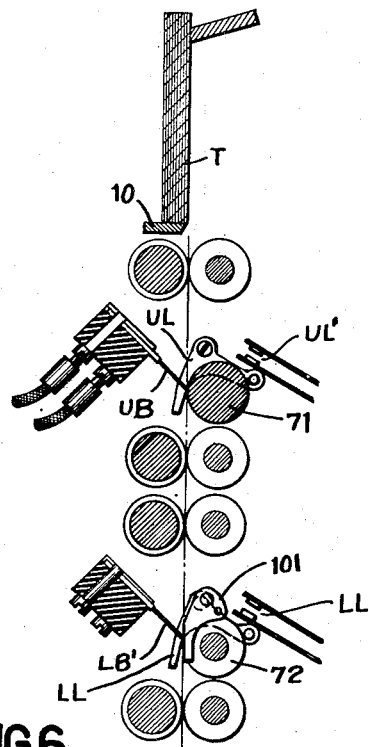
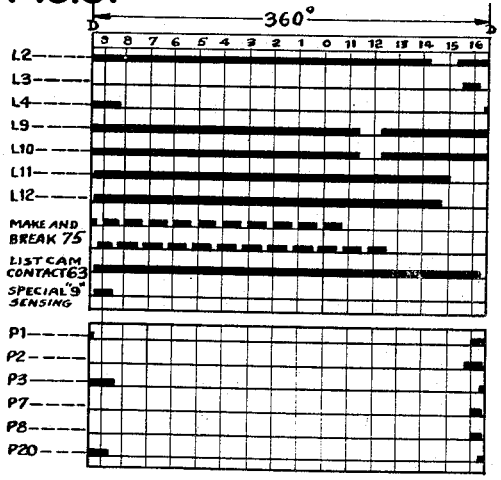
INVENTOR.
William B. Gilson
BY
ATTORNEY Patented June 4, 1940

2,203,015

UNITED STATES PATENT OFFICE 2,203,015

ACCOUNTING MACHINE

William B. Gilson, Naugatuck, Conn., assignor to International Business Machines Corporation, New York, N. Y., a corporation of New York Application March 11, 1936, Serial No. 68,201

1 Claim. (Cl. 235—61.6)

This case relates to card controlled accounting machines.

The record or control card has parallel columns of index point positions variously perforated, according to a selected code, to represent information to be tabulated. The tabulation of information is made in accordance with groups of cards; that is, the cards are grouped by a common classification item and the information from each group tabulated in a manner to distinguish it from the information derived from another group. A total of several groups of such information is also taken, as a rule. For the above purposes, the cards are preliminarily sorted in groups to be subsequently fed in succession through the tabulating machine. When a group has passed through the machine, group change sensing means controls the machine to print a total of the items taken from all the cards of the group.

Usually, a group has several cards, and for convenience, this may be termed a plural card group. In some cases, a card is unrelated to the preceding or following card, and for convenience, the isolated card may be termed a single card group. Ordinarily, the machine accumulates and prints a total under control of single as well as plural card groups.

The object of the present invention is to eliminate accumulating and printing under control of a single card group.

An example of the utility of the invention is in payroll systems. Where an employee is paid by the hour, each day a card may be punched to record the employee's number, the hours at work, the wage rate, the total wage, and such other information as is desired.

At the end of one or more weeks, the cards are sorted in groups, each group pertaining to a different employee number and the cards sent through a tabulating machine which accumulates and prints the total wages for each man. If in addition to the wages paid the employee according to the number of hours worked, a bonus, compensating, or supplementary wage is paid, then a bonus card is also punches for each man, bearing the bonus information. The cards for the period selected for wage tabulation are sorted according to man number groups, each group being sorted with the wage cards of a man followed by his bonus card. When a man has not been employed during the selected period, there will be no wage cards for this man but only a bonus card. The latter is thus an isolated card or a single card group. When the cards are sorted by man number, the single card group containing a bonus card only will be among the plural card groups. It is not intended to pay the bonus to a man who has not been employed during the selected period. It is accordingly desired to eliminate entry into the accumulator of the bonus item and to also eliminate or suppress printing of any of the items on the bonus card whenever the latter is not preceded by wage cards.

For convenience, the wage cards or the like may be termed detail cards and the bonus or the like card may be termed a special card. The object of the invention, stated broadly, is to eliminate accounting operations under control of special cards when the latter are not preceded by individual cards or detail cards, regardless of the type of information represented on the cards.

Further, an object of the invention is to eliminate entry or printing of items on a special card when the latter is immediately preceded by another special card.

The special card has a special perforation in the margin and under control of this perforation, entry and printing of items from the special card is determined.

Another object may then be stated as the provision of means to suppress item entry or printing from the first record card of a group when the latter contains a special perforation.

Figure 2:
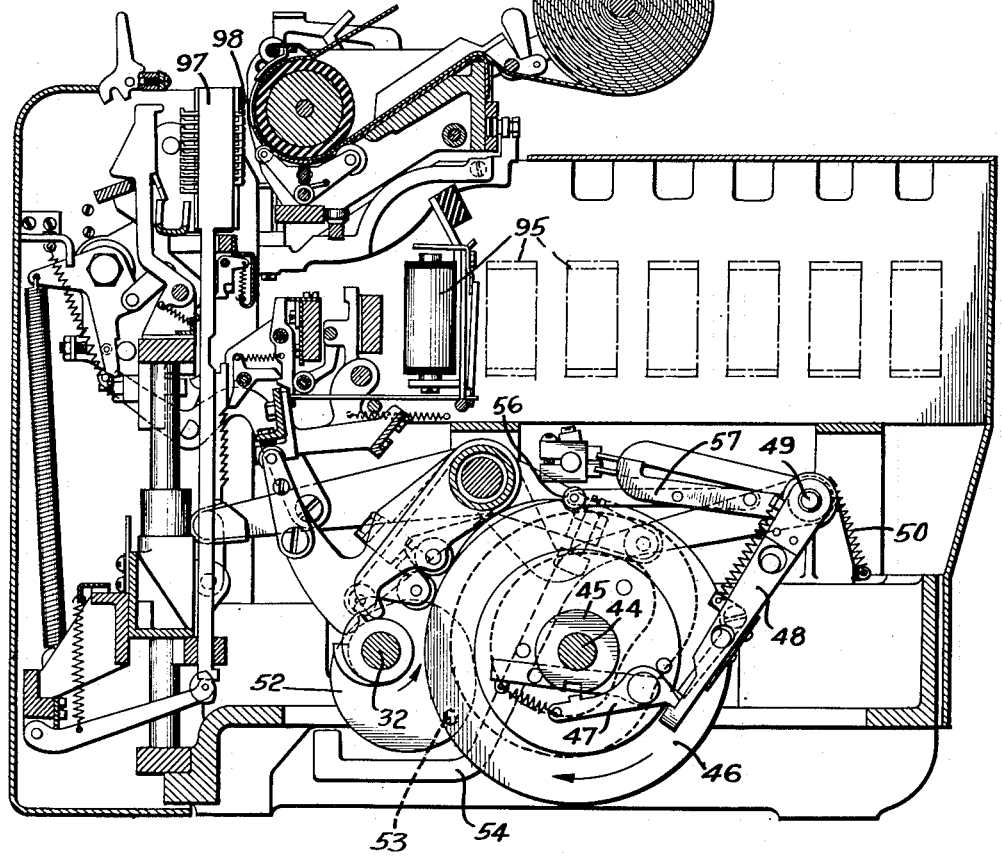
Figure 3:
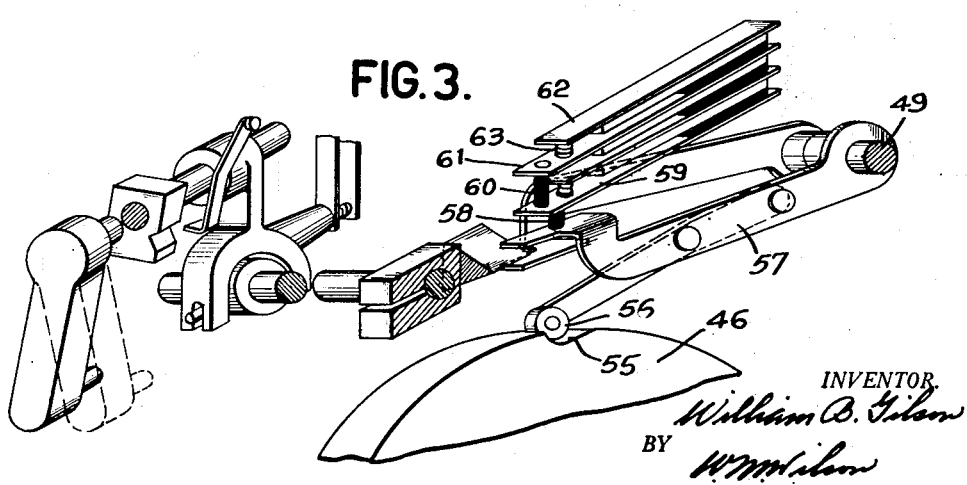

Other objects will appear from the following parts of the specification and from the drawings, in which Fig. 1 is the circuit diagram, Fig. 2 is a section through the printing unit, Fig. 3 is a detail of the listing cam contacts and their controls.

Fig. 4 is a section through the upper and lower card analyzing instrumentalities, Fig. 5 shows a series of cards operated on by the machine and their relationship to the lower card analyzing brushes, and Fig. 6 is a time chart.

The tabulating cards T (Figs. 4 and 5) have a certain number of parallel columns, eighty, for example; each column having index point or perforation receiving positions 9, 8—1, 0, 11, and 12, perforated according to a selected code to represent data. The special, bonus, cards in addition are perforated in the right hand margin after the eightieth column and in a location in said margin corresponding to the 9 index point position.

The adaptation of the invention to the machine disclosed in Patent No. 1,976,617 will be explained but it is understood that the invention may also be applied to other, similar machines.

In order to assist in understanding the invention, a brief explanation will be given of the manner in which the machine is set in operation to feed cards and effect total printing and reset cycles under control of the group number card columns.

In the following parts of the description, the parts peculiar to the present invention may be referred to as special or new parts.

Assume the stack of cards T placed in supply hopper 10 (generally indicated in Fig. 4) contains assorted groups of detail and bonus wage cards with the bonus card normally occurring at the end of its group (see Fig. 5).

Referring to the circuit diagram, Fig. 1, the operator first depresses reset key R to close reset key contacts R', completing the following circuit:

*Circuit A—First manual reset:* From line 20, through closed cam contacts P3, relay 21, line 22, reset key contacts R', closed relay contacts 23a, line 24, closed cam contacts L2, and to line 25.

Relay 21 energized by above circuit closes contacts 21a which by-pass reset key contacts R' to maintain magnet 21 energized following the release of the reset key.

When contacts 21a close, they also complete the following circuit:

*Circuit B—Reset clutch magnet:* From line 20, through contacts P3, closed relay contacts 26a, reset clutch magnet 27, contacts L4, relay contacts 21a, and to line 25.

Above circuit energizes reset clutch magnet 27 to close contacts 27a for completing the following circuit:

*Circuit C—Reset motor:* From line 20, through reset motor RM, relay 29, line 30, contacts 27a, line 31, and to line 25.

Circuit C sets motor RM in operation.

At this time then, motor RM will be running and clutch magnet 27 will have clutched the total print and reset shaft 32 (see Fig. 2) to the motor drive for a single revolution. (The details of the reset motor drive and reset clutch are disclosed in aforementioned Patent No. 1,976,617.)

During the total print and reset cycle, cam contacts P7 and P8 close momentarily, completing the following circuit:

*Circuit D—Motor control relay:* From line 20, through cam contacts P7, P8, magnets 33, 34, motor control relay 35, line 36, closed cam contacts L10, L9, and conductor 37, to line 25.

Magnet 33 is energized by above circuit to close contacts 33a to by-pass contacts P7 and P8 and maintain the circuit closed after the completion of the total print and reset cycle.

Circuit D also energizes motor control relay 35 to close contacts 35a and open contacts 35b. With contacts 35a closed, depression of start key ST to close start key contacts ST' closes the following circuit:

*Circuit E—Tabulating motor clutch magnet:* From line 20, through closed contacts P1, tabulating clutch magnet 39, closed contacts 39a, relay 23, start key contacts ST', stop key contacts SP', relay contacts 35a (now closed), and to line 25.

Magnet 39 is energized by above circuit to open contacts 39a, thus causing above circuit to be completed through a by-pass path E1 including line 40, magnet 41, and line 42. Energization of magnet 41 results and closes contacts 41a to complete the following circuit:

*Circuit F—Tabulating motor:* From line 20, through motor TM, contacts 41a, and to line 25.

The above circuit sets motor TM running and since clutch magnet 39 has been energized, the machine goes through a tabulating or card feeding cycle.

Circuit E also energized relay 23 to close contacts 23b, by-passing start key contacts ST' through a path E2 extending from line 25, through cam contacts L2, line 24, and contacts 23b.

Cam contacts L2 break near the end of the tabulating cycle to open path E2. With start key contacts ST' also open, then the circuit through magnets 23, 39, and 41 is open and the latter magnets deenergized. As a result, motor TM stops at the end of one cycle.

During this first tabulating cycle, cam contacts L9 and L10 open but motor control relay circuit is maintained through contacts LCLa and UCLa which shunt cam contacts L9 and L10.

Near the end of the first tabulating cycle, the leading end of the first card engages upper analyzing brushes UB (see also Fig. 4) and operates upper card lever UL to close contacts UL', thereby completing a circuit through magnet UCL in a manner not illustrated here but fully disclosed in aforesaid Patent No. 1,976,617. Energization of magnet UCL results, causing contacts UCLa to open. By this time, however, cam contacts L9 and L10 have closed again so that circuit D is still operative and relay 35 remains energized.

The operator now depresses start key ST for the second time to close contacts ST', again completing tabulating clutch circuit E and TM motor circuit F. A second tabulating cycle is gone through during which the first card feeds to the lower set of brushes LB while the second card goes to the upper analyzing brushes. Near the latter part of the second tabulating cycle, the lower card engages lower card lever LL to close card lever contacts LL'. As disclosed in aforesaid Patent No. 1,976,617 closing of contacts LL' energizes lower card lever relays LCL.

During the second tabulating cycle, at the time cam contacts L9 and L10 open, contacts UCLa are also open so that circuit D through relay 35 is broken to open relay contacts 35a and close contacts 35b. With contacts 35a open, the circuit for tabulating clutch magnet 39 is made only through path E2. Near the end of the second tabulating cycle, cam contacts L2 open to break path E2. As a result, magnet 39 is deenergized, contacts 39a open, magnet 41 is deenergized, and the tabulating motor circuit F breaks. At the end of this second tabulating cycle, the first card is at the lower analyzing brushes UB and the second card at the upper analyzing brushes.

During the second tabulating cycle, after contacts 35b close, cam contacts L3 also close, establishing the following circuit:

*Circuit G—Automatic reset initiation:* From line 20, through cam contacts P3, magnet 21, line 22, cam contacts L3, switch 45, contacts 35b, and to line 25.

Magnet 21 closes contacts 21a to by-pass cam contacts L3.

At the end of the second tabulating cycle, cam contacts L4 close to automatically establish reset clutch magnet circuit B, which in turn causes reset motor circuit C to close. Thus, after the second tabulating cycle, the machine goes through an automatically initiated reset cycle. During this latter reset cycle, cam contacts P7 and P8 close to again establish circuit D of motor control relay 35.

Near the end of the second reset cycle, cam contacts P2 close momentarily to form a circuit path E3 for tabulating clutch magnet 39 and relay 23.

*Circuit E3:*—*Automatically initiated tabulating cycle:* From line 20, through contacts P1, magnet 39, contacts 39a, relay 23, switch 46, contacts P2, contacts LCLb, contacts SP', and contacts 35a, to line 25.

Energization of magnet 39 initiates the third tabulating cycle.

The machine will now continue to go through successive tabulating cycles as long as cards of the same group are at the upper and lower analyzing stations.

During the tabulating cycle, the motor TM drives shaft 44 (see Fig. 2) which has a clutch collar 45. Rotatably mounted on shaft 44 is a box cam 46 which carries a clutch dog 47, for co-operation with clutch collar 45. Dog 47 is latched out of engagement with clutch collar 45 by the lower end of a bell crank lever 48 fast to a shaft 49 and held in clockwise position (Fig. 2) by a spring 50. Box cam 46 when rotated causes listing or individual item printing, as disclosed in Patent No. 1,976,617. If, during a tabulating cycle, clutch dog 47 remains latched by lever 48, then box cam 46 does not operate and no listing occurs.

Lever 48 must be unlatched from dog 47 to permit the dog to engage with clutch collar 45 and couple cam 46 to shaft 44 for rotation.

The machine may be manually set for listing or non-listing. In the present case it is set for non-listing and lever 48 is permitted to remain in latching coaction with clutch dog 47 except during the first tabulating cycle which follows a total print and reset cycle. The purpose of the listing operation during the first such tabulating cycle is to cause the group number to be printed. As previously explained, during the reset cycle, shaft 32 is set in operation for a revolution. On shaft 32 is a disk 52 from one face of which a stud 53 projects. During the later portion of the revolution of shaft 32, pin 53 rides past the left butt end of an arm 54 fast to shaft 49 and in doing so cams the arm 54 downwardly to rock shaft 49 counterclockwise (Fig. 2). Lever 48 which is fast to shaft 49 thereupon moves counterclockwise and releases clutch dog 47 which springs into engagement with clutch collar 45. The coaction of pin 53 with arm 54 is momentary and is followed by return of arm 48 in a clockwise direction, under the urging of spring 50. The tail of dog 47 has, however, moved to a position below the latching shoulder of lever 48 and therefore upon return of the latter clockwise, it strikes the butt end of the tail of dog 47 and does not disturb the clutched position of dog 47 with respect to collar 45. Accordingly, during the tabulating cycle which follows the reset cycle, the listing cam 46 will rotate one revolution before the tail of dog 47 is again latched by lever 48 in declutching position. The dog then stays in declutching position during the following tabulating cycles and until latch lever 48 is again released by the reset shaft.

When the listing cam 46 is in home position and the machine is set, as in the present case, for non-listing, a short cam depression 55 in the periphery of the listing cam is engaged by a roller 56 on the free end of a lever 57 rotatably carried by shaft 49. Lever 57 engages an insulating stud 58 depending from a spring blade 59 which in turn engages a special insulating stud 60 depending from another, special, spring blade 61. The spring blade 61 and a special spring blade 62 carry between them the special companion contacts 63.

When roller 56 is seated in depression 55, then contact points 63 remain open. Thus, during the tabulating cycles in which no listing occurs and therefore in which cam 46 does not rotate, the contact points 63 remain open. During the tabulating cycle immediately following a reset cycle, the listing cam 46 is set in operation for one revolution, as previously explained. At the beginning of the revolution of cam 46, roller 56 will be cammed out of depression 55, thereby causing clockwise rocking of lever 57 which through elements 58, 59, and 60 lifts blade 61 to close contacts 63. As shown in Fig. 6, the special contacts 63 close shortly after the D position or the beginning of the tabulating cycle and before the 9 cycle point. The function of these contacts will be brought out hereinafter.

The machine is set for minor group control. If the cards at the upper and lower analyzing stations are not of the same group, then the minor group control means will operate to open circuit D and deenergize motor control relay 35. In turn, this will interrupt tabulating operations and initiate a total print and reset cycle.

In the assumed example, the groups are differentiated by man number items punched in certain of the columns. The upper brush UB for sensing one of the latter columns is connected by a plug wire 65 to plug socket 66 wired to one end of pick-up coil 67 of a duo wound relay RL. The other end of coil 67 is wired to a plug socket 68 connected by plug wire 69 to the corresponding lower brush LB. During the tabulating cycle, upper and lower cards will be feeding concurrently through the upper and lower analyzing stations and if the man number items are the same, then at some time during the tabulating cycle, the corresponding upper and lower brushes will simultaneously sense perforations and the following circuit will be formed (see Fig. 1):

*Circuit H*—*Pick-up coil:* From line 20, through cam contacts L11, line 70, common contact roller 71 (see also Fig. 4) of the upper analyzer, the brush UB (sensing a perforation in a group control column of the upper card), a plug wire 65, plug socket 66, pick-up coil 67, plug socket 68, the brush LB sensing a perforation in the corresponding group control column of the lower card, common contact roller 72 (Fig. 4 also) of the lower analyzer, closed special relay contacts 74a, serially through make and break timing contacts 75, line 76, lower card lever contacts LL', and to line 25.

Circuit H energizes pick-up coil 67. In above manner, when cards of the same group are passing the upper and lower brushes, then during the index point analyzing period, all the pick-up coils 67 plugged to the upper and lower brushes sensing the group control columns will be energized.

Energization of a coil 67 closes contacts 67a and 67b. Closing of contacts 67a completes a circuit through holding coils 78 of the relays RL as follows:

*Circuit I*—*Group control holding coil circuit:* From line 20, through cam contacts L12, contacts 67a, coil 78, and wire 37 to line 25.

Holding coils 78 maintain contacts 67a and 67b closed after pick-up coils 67 are deenergized.

During the item analyzing period 9 to 11 (see

Fig. 6) cam contacts L9 and L10 are closed to maintain circuit D of motor control relay 35 operative. If during the item analyzing period, cards of the same group were at the upper and lower analyzing station, then group control relays RL have been operated to close contacts 67b. Under the control of cam contacts L12, these contacts 67b are held closed during the open interval of cam contacts L9 and L10. Accordingly, circuit D will be completed through a group change sensing path D1 which, starting from the lower terminal of cam contacts L10, extends through line 82, serially through closed contacts 67b, plug wire 83, socket 84, line 85, switch 86 (closed when the machine is set only for minor control) contacts UCLe (now closed), line 37, and to line 25.

Thus, so long as the upper and lower cards are of the same group, motor control relay 35 will remain energized and the machine will go through successive tabulating cycles.

During the tabulating cycles (beginning with the third), the items in selected card columns are accumulated. The different items to be accumulated are severally plugged to different banks of accumulators.

For example, if the wage item has four denominational orders, it is represented by perforations in four adjacent card columns and brushes LB for these columns are connected through plug wires (not shown) to plug sockets 88 of the corresponding orders of add magnets 90 of accumulator or add bank, Acc. 1.

During the travel of a card past the lower brushes, when a perforation is sensed in a wage card column, the following analyzing and accumulating circuit is formed:

*Circuit J—Accumulating circuit:* From line 25, through lower card lever contacts LL', line 76, make and break contacts 75, special relay contacts 74a, line 73, lower contact roller 72, the brush LB sensing the perforation, the plug wire (not shown) to plug socket 88, add magnet 90, and to line 20.

Energization of add magnet 90 occurs at a differential time in the tabulating cycle, depending on the location and consequent value of the sensed perforation. In a manner fully disclosed in aforementioned Patent No. 1,976,617, the energization of magnet 90 enters a value in the accumulator bank corresponding to the value of the sensed perforation.

As long as cards of the same group are passing the upper and lower analyzing stations, the tabulating cycles will continue and the accumulation of items from the group of cards will be effected. When the last card of a group is passing the lower brushes UB, the card at the upper brushes does not have agreeing group control perforations and consequently, neither circuits H nor I will form during the item analyzing period 9 to 11.

Consequently, when cam contacts L9 and L10 open, contacts 67b will also be open and motor control relay circuit path D1 will not close, so that motor control relay 35 will be deenergized. As a result, contacts 35a will open and contacts 35b will close. When cam contacts L3 subsequently make near the end of the tabulating cycle, circuit G will close and automatically initiate a total print and reset cycle, as already described.

During this total print and reset cycle, the total standing on the accumulators (for example Acc. 1) will be read out through commutators 92 for differentially energizing printing control magnets 95 (see Figs. 1 and 2). The differential energization of magnets 95 arrests type bars 97 with the type for printing the read-out total in printing position. The specific manner in which the total is read out, the type bars stopped under control of magnets 95, the actuation of the type bars, and the other attendant total printing operations are explained in Patent No. 1,976,617 and will not be gone into here.

After the total printing, resetting of the accumulators is effected; for an explanation of this, recourse should be had to aforementioned patent.

During the total print and reset cycle, pin 53 cooperated with arm 54 to release latch 48 from clutch dog 47, as explained before. The listing cam 46 is thus coupled to tabulating motor-driven shaft 44 at the end of the reset cycle. Further, as already explained, the reset cycle means again causes circuit D to form and energize motor control relay 35 following which the reset cycle forms circuit E3 for automatically initiating a tabulating cycle. Thus, at the end of the reset cycle, listing cam 46 is coupled to shaft 44 and a tabulating cycle initiated.

At the beginning of this tabulating cycle, listing cam 46 closes special contacts 63. At the same time, the first card of the new group starts moving through the lower analyzer. As explained before, the bonus or special cards have a special "9" position perforation in the margin at the side of the last or eightieth card column while the detail cards do not have any perforation at all in this margin (see Fig. 5). If a detail card is the first of the new group, the closing of contacts 63, which occurs only during the first tabulating cycle following the reset cycle, has no effect. If the first card fed through the lower analyzer after the reset cycle is a special or bonus card, then entries from this card into the accumulator are eliminated. This result is had as follows:

Referring to Figs. 1, 4, and 5, a special analyzer brush LB' for sensing the margin to the right of the eightieth or last card column is provided. As explained above, the bonus cards have a special perforation located in the "9" position in this margin and brush LB' is so located as to sense the special perforation shortly after the D position and before the 9 cycle point as indicated in Fig. 6. If the tabulating cycle is the first one following the total print and reset cycle, then cam contacts 63 will be closed by listing cam 46 at the very beginning of the cycle. The special perforation of the bonus card is sensed shortly after D. Cam contacts L11 close also shortly after D and before the "9" cycle point.

With contacts 63 and L11 closed, when the special perforation of the bonus card is sensed, the following circuit will be completed:

*Circuit K—Entry elimination:* From line 20, through cam contacts L11, wire 70, special wire 100, special fixed contact arm 101, special brush LB', special contacts 63, special or elimination relay 74, special switch 102, and to line 25.

Energization of relay 74 opens special contacts 74a and closes special contacts 74b forming the following circuit.

*Circuit L—Holding circuit for elimination relay:* From line 20, through special closed print cycle cam contacts P20, contacts 74b, relay 74, switch 102, and to line 25.

The elimination holding circuit remains operative for the remainder of the tabulating cycle and until cam contacts P20 open during the next total taking cycle and consequently contacts 74a remain open for the same time. The opening of contacts 74a occurred by operation of circuit K which formed when cam contacts L11 closed shortly after D and before the 9 point of the tabulating cycle. The "9" index point circuit J or H is timed by contacts 75 to make at the 9 point of the tabulating cycle. As described before, the adding circuit J must go through closed contacts 74a. Similarly, the group control pick-up coil circuit H must go through closed contacts 74a.

Since contacts 74a have been opened by the elimination circuit K before the 9 point of the cycle and continue open by operation of circuit L until after the item analyzing period, it follows that neither the adding circuits J nor the pick-up coil circuits H can be formed under control of a bonus card passing through the lower analyzer during the first tabulating cycle following a total print and reset cycle.

Thus, the entry and printing of items recorded on the bonus card is eliminated when one bonus card pertaining to one man number follows the bonus card of a different man number. Stated another way, when the bonus card constitutes a single card group or is not accompanied by preceding detail cards, the entry and printing of items from the bonus card is suppressed. Further, since the sensing of this bonus card does not result in energizing the pick-up coils 67 of group control relays, the group change sensing circuit D1 will not form and motor control relay 35 will be deenergized and circuit G for automatically initiating a total print and reset cycle will be completed. The machine will go through a total printing and reset cycle. Since the accumulator has not received an entry from the bonus card, the reading of the accumulator is zero, and therefore the printing means will not effect any imprint at all, as is well known in the art. Further, during this total print and reset cycle, cam contacts P20 open to break the holding circuit L of elimination relay 74.

It is also evident from the above that if the bonus card is out of place and followed instead of preceded by detail cards, that elimination of the items from the bonus card will also be effected and a reset cycle followed by a tabulating cycle will occur to enter the items from such detail cards. This means then that when it is desired to eliminate a bonus item, the bonus card may be placed at the head of its group.

If it is not desired to use the single card group elimination device, switch 102 is opened to prevent circuit K from being formed.

Summary

The operation is believed clear from the preceding description. Briefly, assume cards as shown in Fig. 5 are to pass in ascending order through the machine. The first card shown is a bonus card marked G1 and has a special perforation S. This card is not preceded by detail cards. During the tabulating cycle in which card G1 passes through the lower analyzer, elimination circuits K and L have been formed before the item analysis period and have opened contacts 74a to prevent making of group control circuits H or adding circuits J. Thus, the single card group containing card G1 is eliminated from the tabulation.

Following this tabulating cycle, automatic initiation of a reset cycle is effected by circuit G. Listing cam 46 is therefore clutched to tabulating motor-driven shaft 44 so that during the next tabulating cycle, cam 46 rotates and closes contacts 63. During the latter cycle, bonus card G2 goes through the lower analyzer, its special perforation is sensed, and when cam contacts L11 close, elimination circuits K and L again form. Thus, entry of items from special card G2 is eliminated because it precedes the detail card G2, and following the tabulating cycle during which special card G2 passes the lower brushes, a total taking and reset cycle occurs, initiated by circuit G.

During the next tabulating cycle, which follows the last mentioned total taking and reset cycle the items are taken from detail card G2, and then a total print cycle effected to print these items. Entry of items from cards G3, including bonus card G3, then occurs. As bonus card G3 is passing through lower brushes LB, the next card G4 is traversing upper brushes UB. Since the group control numbers (man numbers) on these two cards do not agree, circuits H and I do not form, circuit path D1 does not close when contacts L9 and L10 open, circuit D then breaks, and motor control relay 35 is deenergized. Circuit G then makes, initiating a total print and reset cycle to follow passage of bonus card G3 through the lower brushes. During this latter total cycle, the total of items taken from cards G3, including bonus card G3, is printed and then the accumulators reset. Following this total cycle, a tabulating cycle is initiated. Then entry of items from card G4 takes place.

While the invention has been explained and illustrated in its preferred embodiment, it is to be understood that changes, variations, and modifications may be made according to the principles of the invention and without departing from its scope. I therefore wish to be limited only by the following claim.

What is claimed is as follows:

In an accounting machine for operating on data bearing records arranged in groups and which pass through the machine during tabulating cycles; the combination of accounting instrumentalities, record sensing elements and circuits controlled by the sensing elements for controlling operation of the accounting instrumentalities in accordance with the data on the records, said circuits including a common current connection to said sensing elements, a normally closed switch in said connection, a device for sensing a special designation of a record before any data on the record can be effectively sensed by the sensing elements, selectively operable means operable during the tabulating cycle in which the first record of a group passes through the machine for coacting with said sensing device, means for rendering the selectively operable means effective for coaction with the sensing device only during the latter tabulating cycle, and means operated by coaction of the selectively operable means with the sensing device during the latter cycle upon the device sensing a special perforation for opening said switch to prevent the formation of said circuits.

WILLIAM B. GILSON.